D. S. KENT & W. A. WERCKLE.
NUT LOCK.
APPLICATION FILED MAR. 25, 1912.

1,038,386.

Patented Sept. 10, 1912.

WITNESSES.
Pearl Copeland
Mildred J. Boman

INVENTORS
Dana S. Kent and
William A. Werckle
BY
La Porte + Bean
ATTYS.

UNITED STATES PATENT OFFICE.

DANA S. KENT AND WILLIAM A. WERCKLE, OF PEORIA, ILLINOIS.

NUT-LOCK.

1,038,386.

Specification of Letters Patent.

Patented Sept. 10, 1912.

Application filed March 25, 1912. Serial No. 686,145.

*To all whom it may concern:*

Be it known that we, DANA S. KENT and WILLIAM A. WERCKLE, citizens of the United States, residing at Peoria, in the county of Peoria and State of Illinois, have invented certain new and useful Improvements in Nut-Locks, of which the following is a specification.

Our invention relates to improvements in nut locks and especially to devices that are designed to hold the nut in place on the axles of vehicles of various sorts.

The principal object of our invention is to provide such a device which is simple in construction and easy to operate, and which may be applied with facility. The nut may be applied and removed when the device is in its unlocked position but is securely held in place to prevent its accidental removal or loss when the device is in its locked position.

Our invention consists broadly in providing a disk which is mounted eccentrically on a bearing piece on the end of the axle skein, the disk being adapted to be moved on the eccentric pivot or bearing so as to have a portion thereof projecting over the end of the nut to prevent its accidental loss or removal. The disk may be moved back to an unlocked position when the nut may be readily removed.

To the accomplishment of the foregoing and such other objects as may hereinafter appear our invention consists in the construction, combination and arrangement of parts hereinafter described and sought to be defined in the appended claims, reference being had to the accompanying drawings which illustrate a preferred and modified embodiments of our invention, it being understood that in practice various changes may be made in the construction of the device within the scope of the claims without digressing from our inventive idea.

Figure 1:
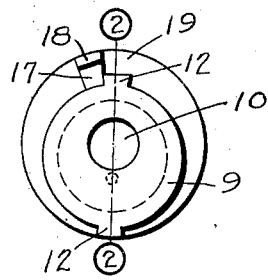
Figure 2:
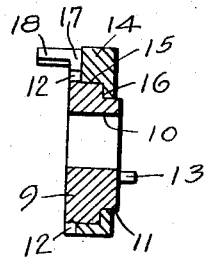
Figure 3:
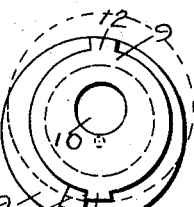
Figure 4:
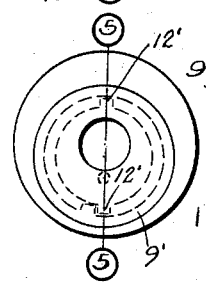
Figure 5:
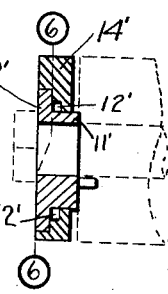
Figure 6:
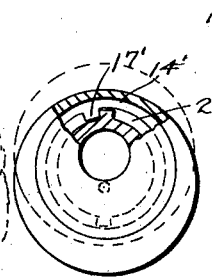
Figure 7:
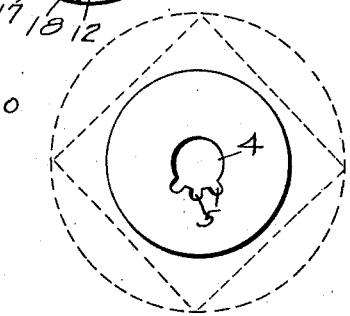
Figure 8:
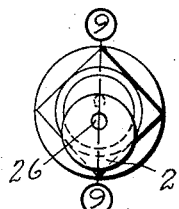
Figure 9:
Figure 10:
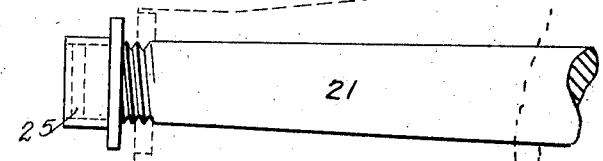
Figure 11:
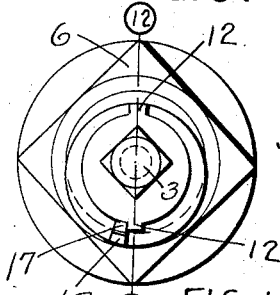
Figure 12:
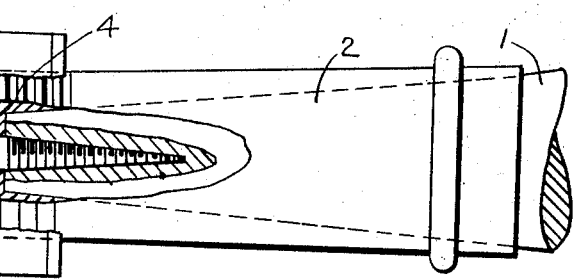

In the drawings, Figure 1 is a plan view of the preferred form of our device in its unlocked position. Fig. 2 is a cross section on line 2—2 of Fig. 1. Fig. 3 is a plan view thereof in its locked position. Fig. 4 is a plan view of a modified form of our invention in its unlocked position. Fig. 5 is a sectional view taken substantially on line 5—5 of Fig. 4, other parts being shown in dotted lines. Fig. 6 is a plan view thereof showing the device in its locked position, parts thereof being broken away. Fig. 7 is an end view of the skein and nut. Fig. 8 is an end view of another form of our device in its locked position. Fig. 9 is a cross section thereof taken substantially on line 9—9 of Fig. 8. Fig. 10 is a perspective view of the axle with our device applied thereto, showing how the nut may be screwed thereon when the device is in its unlocked position, the form shown being that illustrated in Figs. 8 and 9. Fig. 11 is an end view of the preferred form of our device shown applied to an axle and in locked position. Fig. 12 is a side elevation of the device applied to an axle, parts thereof being shown in section taken substantially on line 12—12 of Fig. 11.

In the drawings like characters of reference indicate corresponding and like parts.

In the first place it is to be understood that this device may be made for either right or left hand axles, that is, where the thread is either a right or left hand thread.

Referring now particularly to Figs. 1, 2, 3, 11 and 12, the reference character 1 indicates the ordinary wooden axle to which is applied the usual skein 2 having the skein bolt or lag screw 3, the end of the skein having the opening 4 therethrough to permit the passage of the screw 3 and having a plurality of recesses 5, adjacent said opening for a purpose hereinafter to be described. The nut 6 is designed to apply on the end of the skein. Our invention contemplates the provision of a device which will positively hold the nut in place and prevent its loss or accidental removal. This locking device 7, comprises the bearing member or disk 9, which is in the form of an annular member having an opening 10 passing therethrough off center. The lag screw 3 passes through this opening. This member is provided with a reduced portion 11 at one end and on the other end has the diametrically disposed lugs or projections 12. A pin or projection 13 is provided on the reduced end of this member which is adapted to rest in one of the openings 5 on the end of the skein to hold the member 9 stationary. The locking member 14 is adapted to be turned on the member 9 as a pivot or bearing member and is in the form of an annulus having the opening 15 therein positioned off center or eccentrically. This member has the inwardly extending flange 16 which is adapted to bear against the shoulder formed by the reduced portion 11 which extends beyond this flange or shoulder as shown. The lugs or projections 12 on the member 11 are adapted to extend over the top of member 14 and to engage with the stop 17 which has the upstanding portion 18 forming the finger piece.

The device as described is held in place on top of the nut by means of a skein bolt or lag screw, the member 9 being considerably thicker than the locking member 14 so as to prevent the latter from being bound against the nut 6. When the device is in its unlocked position as shown in Fig. 1, the nut may be screwed on and off readily. When the nut is on, it is only necessary to rotate the locking member 14 by means of the finger piece, when the larger bearing portion 19 thereof will be extended outward over the face of the nut, the projections 12 and stop 17 limiting the movement properly. This will hold the nut against displacement, the stops being so positioned that should the nut have a tendency to turn loose and carry with it the locking member 14 they will engage and prevent such movement.

The modified form of our device shown in Figs. 4, 5 and 6 is substantially the same as the one just described with the exception that the locking projections and stops are positioned on the inside of the device instead of on the outside. The member 9' is provided with the two lugs or projections 12' extending from the reduced portion 11' as shown. These lugs or projections are adapted to move in the recess 20 formed in the locking member 14', the stop 17' being provided in one part of said recess. This device operates in the same manner as the one previously described.

The form of our invention illustrated in Figs. 8, 9 and 10 is particularly adapted for buggy axles, but of course may be used for any vehicles. The axle 21 is bored as at 22 to receive the locking member 23 which is normally forced outwardly by means of spring 24. The locking disk 25 is eccentrically pivoted by means of the pin 26 which is secured in the end of the axle. The under side of the disk is provided with the recesses 27, in which the locking member 23 is adapted to engage. In one position as indicated by Fig. 10 the nut may be screwed and unscrewed, but when the nut is on the disk 25 is swung on its eccentric pivot so that part thereof overlaps the nut, the locking member 23 then engages in one of the recesses 27 and holds the disk preventing accidental removal or displacement of the nut.

In the forms shown in Figs. 1 to 6 of the drawings, in order to adapt the device for use with either a right hand or left hand screw thread, it is only necessary to change the relative position of the lugs or projections 12 and 12' and the stops 17 and 17'. This will prevent the locking member from turning in case the nut should have a tendency to turn.

It is obvious that we have shown a device wherein the disk is mounted on an eccentric pivot or bearing member, so as to be moved to present a bearing portion over the end of a nut to retain the same in position. The various stops are provided to prevent the further movement of the locking member in case the nut should have a tendency to unscrew.

The device in its various forms is very simple and compact, it being made of few parts, which are not readily disarranged and which may be applied upon a vehicle by anyone. It is of undoubted utility and acts efficiently to prevent the accidental loss of the nut from off the axle.

What we claim is:—

1. In a device of the character described and in combination, an axle and its nut, a locking member on the end of said axle, having an eccentric bearing whereby the locking member may be turned to one position to permit the removal and application of the nut, and to another position to overlap the nut and prevent its working loose, and means for limiting the movement of the locking member.

2. A device of the character described comprising a bearing member in the form of a disk having an annular opening therethrough off center, a locking member in the form of an annular disk having an opening located eccentrically therein in which said bearing member is positioned, said members being adapted to be rotated relatively to each other.

3. A device of the character described comprising a bearing member in the form of a disk having an annular opening therethrough off center, a locking member in the form of an annular disk having an opening located eccentrically therein in which said bearing member is positioned, said members being adapted to be rotated relatively to each other, and stops on said members for limiting their movement relatively to each other.

4. A device of the character described comprising a bearing member in the form of a disk having an opening therethrough and positioned off center, lugs or projections on said member, a locking member having an opening eccentrically positioned therein to receive said bearing member, said locking member having a stop thereon, against which one of said lugs or projections is adapted to engage, said members being rotatable relatively to each other.

In testimony whereof we affix our signatures, in presence of two witnesses.

DANA S. KENT.
WILLIAM A. WERCKLE.

Witnesses:
GEORGE T. BEAN,
MILDRED F. BOMAN.

Copies of this patent may be obtained for five cents each, by addressing the "Commissioner of Patents, Washington, D. C."